June 26, 1962 R. T. CLEARY 3,041,404
TRUNK SUPERVISORY CIRCUIT
Filed Nov. 17, 1958
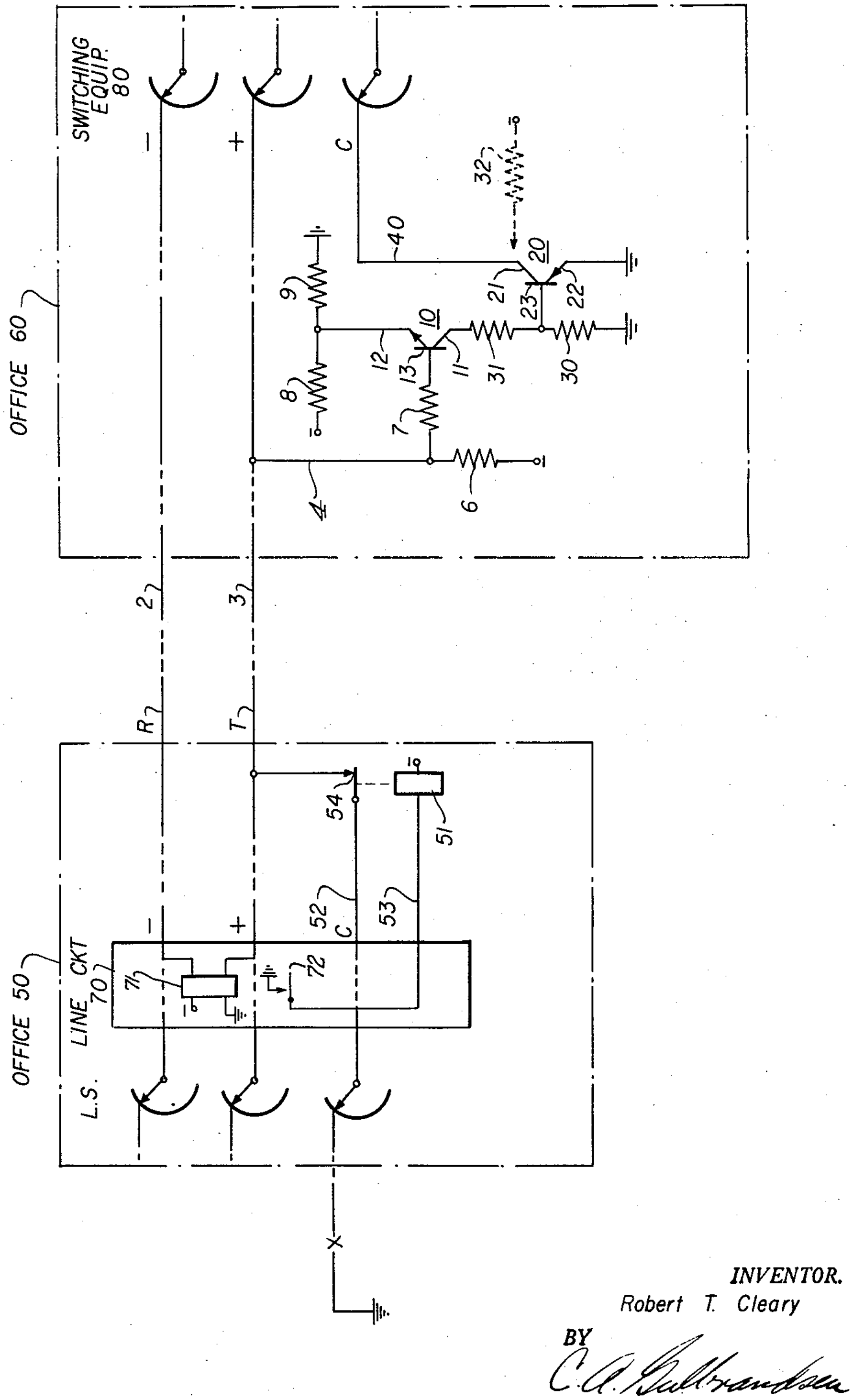
INVENTOR.
Robert T. Cleary
BY
C. A. Gulbrandsen
Atty.

United States Patent Office 3,041,404

Patented June 26, 1962

3,041,404

TRUNK SUPERVISORY CIRCUIT

Robert T. Cleary, Lockport, Ill., assignor to Automatic Electric Laboratories, Inc., a corporation of Delaware Filed Nov. 17, 1958, Ser. No. 774,479

7 Claims. (Cl. 179—18)

This invention relates in general to telephone systems, and more particularly to supervisory functions in telephone systems.

In the operation of a telephone system involving inter-office trunks, it is usually necessary to provide an indication that a trunk and the equipment associated with the trunk are busy after the initiation of a call, so that neither the trunk nor the equipment may be seized by other apparatus. This indication normally is a ground potential extended from the test conductor at one end of the trunk to the test conductor at the other end of the trunk. In the case of an inter-office trunk where only two conductors extend between offices, this ground potential is usually extended over one of the talking conductors.

The trunk may be of considerable length and thus have a relatively high series resistance. In this case, when ground potential is applied to one end of the trunk, the resistance of the trunk prevents the ground potential from appearing, per se, at the other end of the trunk; and only a resistance ground will appear at this other end. Depending on the value of the trunk resistance, this resistance ground may or may not be adequate to mark the trunk busy at the other end. In many cases, it is not adequate and some means must be provided in conjunction with the trunk to repeat the ground potential applied at one end of the trunk as ground potential, and not as resistance ground, at the other end of the trunk.

In present practice, this means commonly is a relay, the winding of which is connected in series with the trunk. Current flows over the trunk and through the winding when ground potential is applied at one end of the trunk. When the current builds up to a value large enough to operate the relay, contacts controlled by the relay are operated, and a circuit which places a busy-marking ground on the other end of the trunk is completed. However, because the trunk resistance may be relatively high, the amount of current which will flow over the trunk may be limited to a value that will cause the relay to be slow-to-operate. This, plus the inherent mechanical cumbersomeness and slowness of a relay, combine to cause a delay in the response of the relay means at one end of the trunk to a ground potential at the other end of the trunk, with an attendant delay in marking the trunk and associated equipment busy. Therefore, double seizure is possible.

It is therefore, a principal object of this invention to provide a transistor arrangement which responds substantially instantaneously, when the trunk with which it is associated is made busy at one end or not available for use, to mark the trunk, and the equipment associated with it at the other end, busy to other equipment.

The invention as to its features and method of operation will best be understood by reference to the following specification taken in connection with the accompanying drawing. This drawing shows two offices, 50 and 60, connected by a trunk comprising conductors 2 and 3. The transistor arrangement is shown in office 60 and comprises a pair of transistors linked together and connected to a talking conductor of the trunk and responsive to a change in potential thereon to apply a busy ground to the test conductor. Base 13 of transistor 10 is connected through resistor 7, to a point on a voltage divider comprising resistor 6 and the resistance of conductor 3 of the trunk. Emitter 12 of transistor 10 is connected to a point on a voltage divider comprising resistors 8 and 9.

Collector 11 of transistor 10 is connected, through resistor 31, to base 23 of transistor 20. Emitter 22 of transistor 20 is connected to ground, and collector 21 of transistor 20 is connected to conductor 40, which is a control conductor.

For purposes of explanation, let it be assumed that the trunk comprising conductors 2 and 3 is a one-way trunk which may be seized in office 60 by a switch train such as 80 through which an outgoing call has been initiated. Let it be also assumed that the equipment terminating the trunk in office 50 consists of a preselecting rotary switch 70 which has access to a group of ticketers which also may be accessed by other preselecting switches. It is, of course, important that no trunk line be seized while the line switch is connected to a ticketer being used for recording another call. The invention is not limited to this particular embodiment, which is chosen merely for illustration of the features of the invention. It may also be used, for example, in conjunction with a two-way trunk terminating in incoming selector banks at either end.

In the assumed embodiment, preselecting switch 70 in office 50 will, along with other preselecting switches in office 50, be resting on contacts associated with an available ticketer. At the time when one preselecting switch such as 70 is seized from office 60, the remaining preselecting switches must be rotated off the contacts on which they are resting to contacts connected to another available ticketer, so that the seized preselecting switch 70 alone will have access to the ticketer associated with the contacts on which preselecting switch 70 is resting. While the preselecting switches are being rotated off the contacts on which they were resting, ground potential must be forwarded from office 50, over the trunk, to the test contact such as C in office 60 so that no trunk will be seized until its line switch is connected to an idle ticketer. It is for this purpose that the transistor arrangement disclosed in this invention is used.

When trunk conductors 2 and 3 are idle, i.e., when no call has been or is being initiated from office 60, the transistors are non-conductive. Base 13 of transistor 10 has negative battery voltage, —48 v. on it through resistors 6 and 7 and emitter 12 is connected to a point on the voltage divider comprising resistors 8 and 9. Thus, base 13 is more negative than emitter 12 due to the comparative values of these resistances, and since transistor 10 is an NPN transistor, which requires that the base voltage be more positive than the emitter voltage for conduction, it is, therefore, non-conductive. Because transistor 10 is non-conductive, no current flows in resistors 30 and 31, and base 23 and emitter 22 of transistor 20 are at the same potential. Since transistor 20 is a PNP transistor, which requires that the base voltage be more negative than the emitter voltage for conduction, this transistor is also non-conductive.

When equipment in office 50, upon which the line switch LS is standing, is seized by another trunk circuit similar to 2 and 3, then ground is placed on trunk conductor 3 over control conductor 52 through the switch LS, contacts 54 of relay 51 to prevent seizure of this trunk by switch 80 until the trunk is available for use. When this ground is applied to conductor 3, the voltage divider comprising resistor 6 and the resistance of trunk conductor 3 is completed. Resistor 6 is to be chosen so that, when this voltage divider is completed, the voltage on base 13 of transistor 10 will be more positive than —40 v. Then, since the voltage on emitter 12 is —40 v., transistor 10 will be conductive. This will allow current to flow in the collector-emitter path of transistor 10, through resistors 30 and 31. The current flowing through resistor 30 causes a voltage drop across this resistor which lowers the potential of base 23 of transistor 20 to a value below ground. Then, since the potential on base 23 is more negative than the potential on emitter 22, transistor 20 becomes conductive. The ground connection on emitter 22 will then appear, through the emitter-collector path, on conductor 40, which is the conductor on which ground must be applied in order to mark the trunk busy and prevent its seizure.

If this transistor arrangement is to be used in a battery-searching system rather than in an absence-of-ground-searching system, a battery connection to collector 21 of transistor 20 through a resistor such as 32 must be made. This will adapt the arrangement to battery-searching operation.

Two transistors are used in the arrangement to avoid an 180° phase shift which would result if only one transistor were used. The combination of one NPN and one PNP transistor is used to simplify the circuit and to increase its reliability. With the common emitter configuration used, more power gain is available. It is possible, for example, to obtain a 10 ohm ground on conductor 40 with a 10,000 ohm resistance ground on the trunk by saturating transistor 20. This saturation would not be possible with a common base or a common collector configuration.

The transistor arrangement has a very high input impedance, so that conductor 4 can remain connected to conductor 3 in office 60 without interfering with the operation of conductors 2 and 3 as talking conductors. Whenever the trunk line is seized by equipment 80 in office 60 relay 71 operates closing ground at contacts 72 to operate relay 51 which, in turn, disconnects the C conductor 52 from the trunk conductor 3 at contacts 54.

It should be understood that this arrangement is adapted for use with any trunk line where it is desired to apply low resistance ground to the test conductor at one end whenever the trunk is busied at the other end or unavailable for use, and that the embodiment shown is only by way of illustration.

While the values of the various components of the transistor arrangement may vary considerably under different conditions one set of values are set forth below as representative.

| | | |
|---|---|---|
| Transistor **10** | | 2N366 |
| Transistor **20** | | 2N141 |
| Resistors **6** and **7** | ohms | 20000 |
| Resistors **8** and **30** | do | 1000 |
| Resistor **9** | do | 4000 |
| Resistor **31** | do | 5600 |
| Resistor **32** | do | 500 |

While a particular embodiment of the invention has been described, it should be understood that this was done merely for purposes of illustration. Various modifications and application of the circuit within the true scope of the invention may be made by those skilled in the art.

What is claimed is:

1. In a telephone system, a trunk line having a plurality of conductors, there being provided at one end of said trunk line a first test conductor, means normally connecting said first test conductor to one of said plurality of conductors operated in response to the seizure of said trunk line for disconnecting said first test conductor and means for applying a ground potential to said first test conductor, and at the other end of said trunk line switching equipment having a contact bank, a second test conductor connected to a contact in said bank, and a transistor network interposed between said second test conducor and said one conductor in said trunk line operated in response to ground potential applied to said first test conductor for directly repeating said ground potential from said first test conductor to a contact in said contact bank by way of said second test conductor to thereby instantaneously busy said trunk line to said switching equipment.

2. In a telephone system, a trunk line having a plurality of conductors, there being provided at one end of said trunk line first test conductor connected to one of said plurality of conductors in said trunk line and means for applying a ground potential to said first test conductor, and at the other end of said trunk line switching equipment having a contact bank, a second test conductor connected to a contact in said bank and apparatus connected between said one conductor in said trunk line and said second test conductor for instantaneously repeating said ground potential directly to a contact in said contact bank, said apparatus comprising a first and a second transistor and biasing networks connected to said transistors, the resistance of said one conductor in said trunk line being a part of the biasing network of said first transistor, said first transistor being biased conductive responsive to said applied ground potential for connecting a negative control potential to said second transistor, and said second transistor, in turn, being biased conductive responsive to the last-mentioned control potential for connecting ground potential to said second test conductor and thence directly to a contact in said contact bank.

3. In a telephone system, the combination as claimed in claim 2, wherein said pair of transistors are transistors of opposite conductivity types.

4. In a telephone system, the combination as claimed in claim 2 wherein said first test conductor is normally connected to said one conductor in said trunk line and wherein there is means operative when the trunk line is seized for opening the connection between said first test conductor and said one conductor.

5. In a telephone system, a signaling circuit extending over a trunk line having a plurality of conductors, there being provided at one end of said trunk line a first test conductor connected to one of said plurality of conductors in said trunk line and means for applying a ground potential to said first test conductor, and at the other end of said trunk line switching equipment having a contact bank, a second test conductor connected to a contact in said bank and apparatus interposed between said one conductor in said trunk line and said second test conductor for instantaneously repeating said ground potential directly to a contact in said bank, said apparatus comprising a first and a second transistor and biasing networks connected to said transistors, the resistance of said one conductor in said trunk line being a part of the biasing network of said first transistor and of such value as to allow, when said ground potential is applied, only a small current flow over said signaling circuit as compared to the current flow over said bank contact of said switching equipment, said first transistor being biased conductive responsive to said small current flow for connecting a negative control potential to said second transistor, and said second transistor, in turn, being biased conductive responsive to the last-mentioned control potential thereby instantaneously repeating said ground potential with a corresponding increase in current flow to said second test conductor and thence directly to a contact in said contact bank.

6. In a telephone system, the combination as claimed in claim 5, wherein said pair of transistors are transistors of opposite conductivity types.

7. In a telephone system, the combination as claimed in claim 5, wherein there is further provided means for disconnecting said first test conductor from said one conductor in said trunk line when said trunk line is seized by the switching equipment at the other end of said line.

References Cited in the file of this patent

UNITED STATES PATENTS 2,829,205 Elliott ---------------- Apr. 1, 1958